(12) United States Patent
Matteucci et al.

(10) Patent No.: US 9,944,872 B2
(45) Date of Patent: *Apr. 17, 2018

(54) METHOD FOR REGENERATING ADSORBENT MEDIA USED FOR EXTRACTING NATURAL GAS LIQUIDS FROM NATURAL GAS

(71) Applicant: Dow Global Technologies LLC, Midland, MI (US)

(72) Inventors: Scott T. Matteucci, Midland, MI (US); H. Robert Goltz, Midland, MI (US); Ajay N. Badhwar, Houston, TX (US); Nicholas J. Shurgott, Rosharon, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/107,678

(22) PCT Filed: Aug. 5, 2014

(86) PCT No.: PCT/US2014/049777
§ 371 (c)(1),
(2) Date: Jun. 23, 2016

(87) PCT Pub. No.: WO2015/130338
PCT Pub. Date: Sep. 3, 2015

(65) Prior Publication Data
US 2016/0355743 A1    Dec. 8, 2016

Related U.S. Application Data

(60) Provisional application No. 61/945,253, filed on Feb. 27, 2014.

(51) Int. Cl.
| | | |
|---|---|---|
| *C10L 3/10* | (2006.01) | |
| *B01J 20/26* | (2006.01) | |
| *B01D 53/04* | (2006.01) | |
| *B01D 53/047* | (2006.01) | |
| *B01J 20/30* | (2006.01) | |
| *B01J 20/20* | (2006.01) | |
| *B01J 20/28* | (2006.01) | |
| *B01J 20/34* | (2006.01) | |

(52) U.S. Cl.
CPC ............ *C10L 3/101* (2013.01); *B01D 53/047* (2013.01); *B01D 53/0462* (2013.01); *B01J 20/20* (2013.01); *B01J 20/267* (2013.01); *B01J 20/28057* (2013.01); *B01J 20/28066* (2013.01); *B01J 20/28085* (2013.01); *B01J 20/28092* (2013.01); *B01J 20/3078* (2013.01); *B01J 20/3416* (2013.01); *B01J 20/3425* (2013.01); *B01J 20/3441* (2013.01); *B01D 2253/202* (2013.01); *B01D 2253/306* (2013.01); *B01D 2253/308* (2013.01); *B01D 2256/245* (2013.01); *B01D 2257/7022* (2013.01); *C10L 2290/542* (2013.01)

(58) Field of Classification Search
CPC .......... B01D 53/0462; B01D 2253/202; B01D 2253/306; B01D 2253/308; B01D 2256/245; B01D 2257/7022; B01D 53/047; C10L 3/101; C10L 2290/542; B01J 20/20; B01J 20/267; B01J 20/28057; B01J 20/28066; B01J 20/28085; B01J 20/28092; B01J 20/3078; B01J 20/3416; B01J 20/3425; B01J 20/3441
See application file for complete search history.

(56) References Cited

U.S. PATENT DOCUMENTS

| | | | | |
|---|---|---|---|---|
| 4,040,990 A | * | 8/1977 | Neely | B01D 53/02 521/142 |
| 8,282,709 B2 | * | 10/2012 | Kuznicki | B01D 53/04 585/820 |
| 8,337,593 B2 | * | 12/2012 | Bresler | B01D 53/0438 95/115 |
| 8,529,662 B2 | * | 9/2013 | Kelley | B01D 53/02 95/148 |

* cited by examiner

*Primary Examiner* — Sharon Pregler (57) ABSTRACT

A method is disclosed for the separation of ethane and heavier hydrocarbons or propane and heavier hydrocarbons from natural gas to provide a methane-rich natural gas stream and less volatile natural gas liquids (NGLs). This method provides for the use of a regenerable adsorbent media comprising a porous cross-linked polymeric adsorbent, a pyrolized macroporous polymer, or mixtures thereof, which is regenerated by a pressure swing adsorption (PSA) process, temperature swing adsorption (TSA) process, or combination of the two. Said regeneration step may be operated as a batch process, a semi-continuous process, or preferably as a continuous process.

5 Claims, 3 Drawing Sheets

METHOD FOR REGENERATING ADSORBENT MEDIA USED FOR EXTRACTING NATURAL GAS LIQUIDS FROM NATURAL GAS

FIELD OF THE INVENTION

This invention relates to a process for the separation of ethane and heavier hydrocarbons or propane and heavier hydrocarbons from natural gas to provide a methane-rich natural gas stream and less volatile natural gas liquids. Specifically, this process provides for the use of a regenerable adsorbent media comprising a porous cross-linked polymeric adsorbent, a pyrolized macroporous polymer, or mixtures thereof, wherein the adsorption/desorption process is performed in a pressure swing adsorption (PSA) vessel, a temperature swing adsorption (TSA) vessel, or a combination thereof.

BACKGROUND OF THE INVENTION

Natural gas consists primarily of saturated hydrocarbon components such as methane, ethane, propane, butane, and heavier hydrocarbons. Natural gas typically contains about 60-100 mole percent methane, the balance being primarily heavier alkanes. Alkanes of increasing carbon number are normally present in decreasing amounts. Carbon dioxide, hydrogen sulfide, nitrogen, and other gases may also be present.

There are many reasons to separate the higher alkanes known as natural gas liquids (NGL) from natural gas to provide a methane rich natural gas stream. One such reason is to meet pipeline specifications or liquefied natural gas (LNG) specification for heating value, dew point, and condensation. Natural gas containing elevated levels of NGL may have a BTU level of 1058 or more, while typical pipeline or LNG specification has a BTU value of 1028 BTU. Some systems, such as gas combustion systems, are designed to operate within a narrow BTU range and may require higher maintenance costs, higher operating temperatures, reduced equipment life expectancy, and/or generate increased pollution if operated at higher BTUs.

Additionally, it may be financially desirable to recover natural gas liquids from natural gas. NGLs including ethane, propane, butane, and lesser amounts of other heavy hydrocarbons may be used as petrochemical feedstocks where they have a higher value as compared to their value as a fuel gas component.

In other instances, gas is co-produced with oil and the concentrations of NGLs can be very high ranging from a fraction of a percent of the gas flow to tens of percent. This gas can be of poor quality due to high levels of carbon dioxide, nitrogen, and other components. The gas flow rate can be small and often it is not economical to bring a pipeline to an isolated location where natural gas is produced, such gas is sometimes referred to as stranded gas. In these instances, the best alternative is to flare the gas. However, flaring of gas high in NGLs may have a significant negative impact on the environment, accounting for a significant amount of $CO_2$ and heat that is injected into the atmosphere. In addition to capturing value for separated NGLs that can be stored in a tank for later transportation and sale, it would be environmentally advantageous to remove the NGLs from the gas to reduce the amount of $CO_2$ and heat uselessly released into the environment.

There are two basic steps for the separation of natural gas liquids from a natural gas stream. First, the liquids must be extracted from the natural gas. Second, these natural gas liquids must be separated themselves, down to their base components. The two principle techniques for removing NGLs from the natural gas stream are the oil absorption method and the cryogenic expander process. These two processes account for around 90 percent of total natural gas liquids production.

The absorption method of NGL extraction utilizes an absorbing oil which has an affinity for NGLs. Before the oil has picked up any NGLs, it is termed "lean" absorption oil. As the natural gas is passed through an absorption tower, it is brought into contact with the absorption oil which soaks up a high proportion of the NGLs. The "rich" absorption oil, now containing NGLs, exits the absorption tower through the bottom. It is now a mixture of absorption oil, propane, butanes, pentanes, and other heavier hydrocarbons. The rich oil is fed into lean oil stills, where the mixture is heated to a temperature above the boiling point of the NGLs, but below that of the oil. This process allows for the recovery of around 75 percent of butanes, and 85 to 90 percent of pentanes and heavier molecules from the natural gas stream.

Although there are many known adsorption processes, there is always a compromise between high recovery and process simplicity (i.e., low capital investment). Common adsorption technologies focus on removal of hydrocarbons, which works well in non-hydrocarbon rich streams, but is limited in applicability in hydrocarbon continuous streams. Further this technology is not selective for certain molecular size/weight.

Cryogenic processes are also used to extract NGLs from natural gas. While absorption methods can extract almost all of the heavier NGLs, the lighter hydrocarbons, such as ethane, are often more difficult to recover from the natural gas stream. In certain instances, it is economic to simply leave the lighter NGLs in the natural gas stream. However, if it is economic to extract ethane and other lighter hydrocarbons, cryogenic processes are required for high recovery rates. Essentially, cryogenic processes consist of dropping the temperature of the gas stream to around −120 degrees Fahrenheit. There are a number of different ways of chilling the gas to these temperatures, but one of the most effective is known as the turbo expander process. In this process, external refrigerants are used to cool the natural gas stream. Then, an expansion turbine is used to rapidly expand the chilled gases, which causes the temperature to drop significantly. This expansion can take place across a valve as well. This rapid temperature drop caused by the Joule-Thompson effect condenses ethane and other hydrocarbons in the gas stream, while maintaining methane in gaseous form. This process allows for the recovery of about 90 to 95 percent of the ethane originally in the natural gas stream. In addition, the expansion turbine is able to convert some of the energy released when the natural gas stream is expanded into recompressing the gaseous methane effluent, thus saving energy costs associated with extracting ethane. These plants can be called JT plants, refrig plants, or cryo plants which are all variations on the same temperature drop processes.

While reliable, cryogenic systems suffer from a number of shortcomings including high horsepower requirements. Further, such systems require relatively rigorous and expensive maintenance to function properly. Mechanical refrigeration systems also have practical limits with respect to the amount of cold that may be delivered, accordingly, the efficiency and capacity of such systems is limited. The operating window (range of operating conditions the plants can function well within) is a relatively narrow window, requires time to start-up and shut-down effectively, and is quite capitally intensive. As a result these facilities are often used at higher gas flow rates to ensure a more economic cost to treat the system. And if the facility is to be constructed, and can only operate in a narrow range of operating conditions, there are significant upstream treatment systems required to remove $CO_2$ (amine systems), water (glycol dehydration) and sometimes even pre-chilling (propane chillers).

Once NGLs have been removed from the natural gas stream, the mixed stream of different NGLs must be separated out. The process used to accomplish this task is called fractionation. Fractionation works based on the different boiling points of the different hydrocarbons in the NGL stream. Essentially, fractionation occurs in stages consisting of the boiling off of hydrocarbons one by one. By proceeding from the lightest hydrocarbons to the heaviest, it is possible to separate the different NGLs reasonably easily.

Of the various alternative technologies, adsorption process appears to be the most promising. An adsorbent suitable for the separation of NGLs should have high adsorption capacity and selectivity for either olefin or paraffin. Adsorbed component should be able to desorb easily by simple chemical engineering operation such as by increasing the temperature or by reducing the pressure. Conventional adsorbents such as zeolites, activated carbon, activated alumina, silica gels, polymer supported silver chloride, copper-containing resins, and the like known in the prior art which exhibit selectivity for ethylene or propylene suffer from one or more drawbacks such as slow adsorption kinetics, poor adsorption capacity, and/or selectivity. Furthermore, due to ever changing business requirements and demands, it is desirable to have adsorbents exhibiting even higher adsorption capacity, selectivity, and/or reversibility for efficient separation of hydrocarbon gases.

It would be useful to have an improved NGL recovery process utilizing a media which can separate NGLs from natural gas, be regenerated by desorbing the separated NGLs, either as one stream or selectively separate one or more of ethane ($C_2$) and heaver hydrocarbons, minimize spent media disposal, and/or have a process unit with a small physical footprint and broad operating window.

SUMMARY OF THE INVENTION

In one embodiment the present invention is a process for separating natural gas liquids from a natural gas feedstream comprising methane and one or more of ethane, propane, butane, pentane, or heavier hydrocarbons, comprising the steps of: (a) providing an adsorbent bed comprising an adsorbent media comprising a porous cross-linked polymeric adsorbent, a pyrolized macroporous polymer, or mixtures thereof, wherein said adsorbent media adsorbs ethane, propane, butane, pentane, heavier hydrocarbons, and/or mixtures thereof, (b) passing the natural gas feedstream through the adsorbent bed to provide a methane rich natural gas stream and a loaded adsorbent media, (c) recovering, transporting, liquefying, or flaring the methane rich natural gas stream, (d) regenerating the loaded adsorbent media to release the adsorbed ethane, propane, butane, pentane, heavier hydrocarbons, and/or mixtures thereof, (e) recovering, transporting, liquefying, re-injecting, excluding, by-passing, or flaring the ethane, propane, butane, heavier hydrocarbons, and/or pentane individually and/or as mixtures, and (f) reusing the regenerated adsorbent media, wherein the said passing of the natural gas stream through the adsorbent bed is performed in a pressure swing adsorption (PSA) vessel containing said adsorbent media, a temperature swing adsorption (TSA) vessel containing said adsorbent media, or a PSA vessel in combination with a TSA vessel.

In another embodiment of the present invention, the steps of the process described herein above are performed as a continually repeating cycle of steps in a system comprising a plurality of adsorption vessels which each undergo their respective cycle of steps while collectively operated sequentially in parallel with one another.

In one embodiment of the process disclosed herein above, the adsorbent media is a partially pyrolyzed macroporous polymer comprising the product of controlled thermal degradation of a macroporous synthetic polymer containing macropores ranging from between 50 to 100,000 Angstroms in average critical dimension, a carbon-fixing moiety, and derived from one or more ethylenically unsaturated monomers, or monomers which may be condensed to yield macroporous polymers, or mixtures thereof, which partially pyrolyzed macroporous polymer comprises particles having: (a) at least 85% by weight of carbon, (b) multimodal pore distribution with macropores ranging in size from 50 Angstroms to 100,000 Angstroms in average critical dimension, and (c) a carbon to hydrogen atom ratio of between 1.5:1 and 20:1, preferably the partially pyrolyzed macroporous polymer comprises particles wherein the surface area of the particles is measured by $N_2$ adsorption, as measured by the BET method, and ranges between 50 and 1500 m$^2$/gram, of which the macropores contribute about 6 to about 700 m$^2$/gram as determined by mercury intrusion techniques.

In another embodiment of the process disclosed herein above, the adsorbent media is a cross-linked macroporous polymeric adsorbent which is a polymer of a monovinyl aromatic monomer crosslinked with a polyvinylidene aromatic compound, preferably the monovinyl aromatic monomer comprises from 92% to 99.25% by weight of said polymer, and said polyvinylidene aromatic compound comprises from 0.75% to 8% by weight of said polymer.

In another embodiment of the process disclosed herein above, the cross-linked macroporous polymeric adsorbent is a polymer of a member selected from the group consisting of styrene, vinylbenzene, vinyltoluene, ethylstyrene, and t-butylstyrene; and is crosslinked with a member selected from the group consisting of divinylbenzene, trivinylbenzene, and ethylene glycol dimethacrylate, preferably the macroporous resin has a total porosity of from 0.5 to 1.5 cc/g, a surface area of from 150 to 2100 m$^2$/g as measured by nitrogen adsorption, and an average pore diameter of from 10 Angstroms to 100 Angstroms.

DETAILED DESCRIPTION OF THE INVENTION

Raw natural gas comes from three types of wells: oil wells, gas wells, and condensate wells. Natural gas that comes from oil wells is typically termed "associated gas". This gas can exist separate from oil in the formation (free gas), or dissolved in the crude oil (dissolved gas). Natural gas from gas and condensate wells, in which there is little or no crude oil, is termed "non-associated gas". Gas wells typically produce raw natural gas by itself, while condensate wells produce free natural gas along with a semi-liquid hydrocarbon condensate. Whatever the source of the natural gas, once separated from crude oil (if present) it commonly exists as methane in mixtures with other hydrocarbons; principally ethane, propane, butane, and pentanes and to a lesser extent heavier hydrocarbons.

Raw natural gas often contain a significant amount of impurities, such as water or acid gases, for example carbon dioxide ($CO_2$), hydrogen sulfide ($H_2S$), sulfur dioxide ($SO_2$), carbon disulfide ($CS_2$), hydrogen cyanide (HCN), carbonyl sulfide (COS), or mercaptans as impurities. The term "natural gas feedstream" as used in the method of the present invention includes any natural gas source, raw or raw natural gas that has been treated one or more times to remove water and/or other impurities.

The terms "natural gas liquids" (NGL) and "ethane plus" ($C_2+$) refer broadly to hydrocarbons having two or more carbons such as ethane, propane, butane, and possibly small quantities of pentanes or heavier hydrocarbons. Preferably, NGL have a methane concentration of 5 mol percent or less.

The term "methane-rich" refers broadly to any vapor or liquid stream, e.g., after fractionation from which ethane plus amounts have been recovered. Thus, a methane-rich stream has a higher concentration of $C_1$ than the concentration of $C_1$ in associated and non-associated natural gas. Preferably, the concentration increase of $C_1$ is from removal of at least 90 mole percent of the ethane in the natural and removal of at least 95 mole percent of the propane plus.

Suitable adsorbents are solids having a microscopic structure. The internal surface of such adsorbents is preferably between 100 to 2000 $m^2/g$, more preferably between 500 to 1500 $m^2/g$, and even more preferably 1000 to 1300 $m^2/g$. The nature of the internal surface of the adsorbent in the adsorbent bed is such that $C_2$ and heavier hydrocarbons are adsorbed. Suitable adsorbent media include materials based on silica, silica gel, alumina or silica-alumina, zeolites, activated carbon, polymer supported silver chloride, copper-containing resins. Most preferred adsorbent media is a porous cross-linked polymeric adsorbent or a partially pyrolized macroporous polymer. Preferably, the internal surface of the adsorbent is non-polar.

In one embodiment, the present invention is the use of an adsorbent media to extract NGLs from a natural gas stream. The mechanism by which the macroporous polymeric adsorbent extracts the NGLs from the natural gas stream is a combination of adsorption and absorption; the dominating mechanism at least is believed to be adsorption. Accordingly, the terms "adsorption" and "adsorbent" are used throughout this specification, although this is done primarily for convenience. The invention is not considered to be limited to any particular mechanism.

When an adsorbent media has adsorbed any amount of $C_2+$ hydrocarbons it is referred to as "loaded". Loaded includes a range of adsorbance from a low level of hydrocarbons up to and including saturation with adsorbed hydrocarbons.

The term "macroporous" is used in the art interchangeably with "macroreticular," and refers in general to pores with diameters of about 500 Å or greater. "Mesopores" are characterized as pores of between 50 Å and larger but less than 500 Å. "Micropores" are characterized as pores of less than 50 Å. The engineered distribution of these types of pores gives rise to the desired properties of high adsorption capacity for NGLs and ease of desorption of NGLs under convenient/practical chemical engineering process modifications (increase in temperature or reduced pressure [vacuum]). The process giving rise to the distribution of micropores, mesopores and macropores can be achieved in various ways, including forming the polymer in the presence of an inert diluent or other porogen to cause phase separation and formation of micropores by post cross-linking.

In one embodiment, the adsorbent media of the present invention is a macroporous polymeric adsorbent of the present invention is a post cross-linked polymeric synthetic adsorbents engineered to have high surface area, high pore volume and high adsorption capacities as well as an engineered distribution of macropores, mesopores and micropores.

Preferably, the macroporous polymeric adsorbent of the present invention is hypercrosslinked and/or methylene bridged having the following characteristics: a BET surface area of equal to or greater than 500 $m^2/g$ and preferably equal to or greater than 1,000 $m^2/g$, and having a particle size of 300 microns to 1500 microns, preferably 500 to 1200 microns.

Examples of monomers that can be polymerized to form macroporous polymeric adsorbents useful are styrene, alkylstyrenes, halostyrenes, haloalkylstyrenes, vinylphenols, vinylbenzyl alcohols, vinylbenzyl halides, and vinylnaphthalenes. Included among the substituted styrenes are ortho-, meta-, and para-substituted compounds. Specific examples are styrene, vinyltoluene, ethylstyrene, t-butylstyrene, and vinyl benzyl chloride, including ortho-, meta-, and para-isomers of any such monomer whose molecular structure permits this type of isomerization. Further examples of monomers are polyfunctional compounds. One preferred class is polyvinylidene compounds, examples of which are divinylbenzene, trivinylbenzene, ethylene glycol dimethacrylate, divinylsulfide and divinylpyridine. Preferred polyvinylidene compounds are di- and trivinyl aromatic compounds. Polyfunctional compounds can also be used as crosslinkers for the monomers of the first group.

One preferred method of preparing the polymeric adsorbent is by swelling the polymer with a swelling agent, then crosslinking the polymer in the swollen state, either as the sole crosslinking reaction or as in addition to crosslinking performed prior to swelling. When a swelling agent is used, any pre-swelling crosslinking reaction will be performed with sufficient crosslinker to cause the polymer to swell when contacted with the swelling agent rather than to dissolve in the agent. The degree of crosslinking, regardless of the stage at which it is performed, will also affect the porosity of the polymer, and can be varied to achieve a particular porosity. Given these variations, the proportion of crosslinker can vary widely, and the invention is not restricted to particular ranges. Accordingly, the crosslinker can range from about 0.25% of the polymer to about 45%. Best results are generally obtained with about 0.75% to about 8% crosslinker relative to the polymer, the remaining (noncrosslinking) monomer constituting from about 92% to about 99.25% (all percentages are by weight).

Other macroporous polymeric adsorbents useful in the practice of this invention are copolymers of one or more monoaromatic monomers with one or more nonaromatic monovinylidene monomers. Examples of the latter are methyl acrylate, methyl methacrylate and methylethyl acrylate. When present, these nonaromatic monomers preferably constitute less than about 30% by weight of the copolymer.

The macroporous polymeric adsorbent is prepared by conventional techniques, examples of which are disclosed in various United States patents. Examples are U.S. Pat. Nos. 4,297,220; 4,382,124; 4,564,644; 5,079,274; 5,288,307; 4,950,332; and 4,965,083. The disclosures of each of these patents are incorporated herein by reference in their entirety.

For polymers that are swollen and then crosslinked in the swollen state, the crosslinking subsequent to swelling can be achieved in a variety of ways, which are further disclosed in the patents cited above. One method is to first haloalkylate the polymer, then swell it and crosslink by reacting the haloalkyl moieties with aromatic groups on neighboring chains to form an alkyl bridge. Haloalkylation is achieved by conventional means, an example of which is to first swell the polymer under non-reactive conditions with the haloalkylating agent while including a Friedel-Crafts catalyst dissolved in the haloalkylating agent. Once the polymer is swollen, the temperature is raised to a reactive level and maintained until the desired degree of haloalkylation has occurred. Examples of haloalkylating agents are chloromethyl methyl ether, bromomethyl methyl ether, and a mixture of formaldehyde and hydrochloric acid. After haloalkylation, the polymer is swelled further by contact with an inert swelling agent. Examples are dichloroethane, chlorobenzene, dichlorobenzene, ethylene dichloride, methylene chloride, propylene dichloride, and nitrobenzene. A Friedel-Crafts catalyst can be dissolved in the swelling agent as well, since the catalyst will be used in the subsequent crosslinking reaction. The temperature is then raised to a level ranging from about 60° C. to about 85° C. in the presence of the catalyst, and the bridging reaction proceeds. Once the bridging reaction is complete, the swelling agent is removed by solvent extraction, washing, drying, or a combination of these procedures.

The pore size distribution and related properties of the finished adsorbent can vary widely and no particular ranges are critical to the invention. In most applications, best results will be obtained at a porosity (total pore volume) within the range of from about 0.5 to about 1.5 cc/g of the polymer. A preferred range is about 0.7 to about 1.3 cc/g. Within these ranges, the amount contributed by macropores (i.e., pores having diameters of 500 Å or greater) will preferably range from about 0.025 to about 0.6 cc/g, and most preferably from about 0.04 to about 0.5 cc/g. The surface area of the polymer, as measured by nitrogen adsorption methods such as the well-known BET method, will in most applications be within the range of about 150 to about 2100 m²/g, and preferably from about 400 to about 1400 m²/g. The average pore diameter will most often range from about 10 Å to about 100 Å.

The form of the macroporous polymeric adsorbent is likewise not critical and can be any form which is capable of containment and contact with a flowing compressed air stream. Granular particles and beads are preferred, ranging in size from about 50 to about 5,000 microns, with a range of about 500 to about 3,000 microns particularly preferred. Contact with the adsorbent can be achieved by conventional flow configurations of the gas, such as those typically used in fluidized beds or packed beds. The adsorbent can also be enclosed in a cartridge for easy removal and replacement and a more controlled gas flow path such as radial flow.

The macroporous polymeric adsorbent can function effectively under a wide range of operating conditions. The temperature will preferably be within any range which does not cause further condensation of vapors or any change in physical or chemical form of the adsorbent. Preferred operating temperatures are within the range of from 5° C. to 75° C., and most preferably from 10° C. to 50° C. In general, operation at ambient temperature or between ambient temperature and 10° C. to 15° C. above ambient will provide satisfactory results. The pressure of the natural gas stream entering the adsorbent bed can vary widely as well, preferably extending from 2 psig (115 kPa) to 1000 psig (7000 kPa). The pressure will generally be dictated by the plant unit where the product gas will be used. A typical pressure range is from 100 psig (795 kPa) to 300 psig (2170 kPa). The residence time of the natural gas stream in the adsorbent bed will most often range from 0.02 second to 5 seconds, and preferably from 0.3 second to 3.0 seconds. The space velocity of the natural gas stream through the bed will most often fall within the range of 0.1 foot per second to 5 feet per second, with a range of 0.3 foot per second to 3 feet per second preferred. Finally, the relative humidity can have any value up to 100%, although for convenience, the preferred range of relative humidity is about 25% to about 98%.

The macroporous polymeric adsorbents of the present invention described herein above can be used to separate ethane, propane, butane, pentane, and heaver hydrocarbons from mixed gases containing methane. Preferably, the macroporous polymeric adsorbents of the present invention adsorb equal to or greater than 60 cm³ STP of propane per gram of sorbent at 35° C. and 500 mmHg of propane. Preferably, the adsorbents of the present invention adsorb equal to or greater than 60 cm³ STP of n-butane per gram of sorbent at 35° C. and 100 mmHg of n-butane. Furthermore, these materials are able to be degassed of propane or n-butane and then able to readsorb equal to or greater than 60 cm³ STP of propane per gram of sorbent at 35° C. and 500 mmHg of propane or readsorb greater than 60 cm³ STP of n-butane per gram of sorbent at 35° C. and 100 mmHg of n-butane at least once. Preferably, the adsorbents of the present invention adsorb equal to or greater than 30 cm³ STP of ethane per gram of sorbent at 35° C. and 600 mmHg of ethane. Preferably, the adsorbents of the present invention adsorb equal to or greater than 100 cm³ STP of pentane per gram of sorbent at 35° C. and 50 mmHg of pentane.

In another embodiment, the adsorbent media of the present invention is a pyrolized macroporous polymeric adsorbent media to extract NGLs from a natural gas stream.

Pyrolized macroporous polymeric adsorbent media are well known, for instance see U.S. Pat. No. 4,040,990, incorporated by reference herein in its entirety. Partially pyrolyzed particles, preferably in the form of beads or spheres, produced by the controlled decomposition of a synthetic polymer of specific initial porosity. In a preferred embodiment, the pyrolyzed particles are derived from the thermal decomposition of macroreticular ion exchange resins containing a macroporous structure.

In general pyrolysis comprises subjecting the starting polymer to controlled temperatures for controlled periods of time under certain ambient conditions. The primary purpose of pyrolysis is thermal degradation while efficiently removing the volatile products produced.

The maximum temperatures may range from about 300° C. to up to about 900° C., depending on the polymer to be treated and the desired composition of the final pyrolyzed particles. Higher temperature, e.g., about 700° C. and higher result in extensive degradation of the polymer with the formation of molecular sieve sized pores in the product.

Most desirably, thermal decomposition (alternatively denoted "pyrolysis" or "heat treatment") is conducted in an inert atmosphere comprised of, for example, argon, neon, helium, nitrogen, or the like, using beads of macroreticular synthetic polymer substituted with a carbon-fixing moiety which permits the polymer to char without fusing in order to retain the macroreticular structure and give a high yield of carbon. Among the suitable carbon-fixing moieties are sulfonate, carboxyl, amine, halogen, oxygen, sulfonate salts, carboxylate salts and quaternary amine salts. These groups are introduced into the starting polymer by well-known conventional techniques, such as those reactions used to functionalize polymers for production of ion exchange resins. Carbon-fixing moieties may also be produced by imbibing a reactive precursor thereof into the pores of macroreticular polymer which thereupon, or during heating, chemically binds carbon-fixing moieties onto the polymer. Examples of these latter reactive precursors include sulfuric acid, oxidizing agents, nitric acid, Lewis acids, acrylic acid, and the like.

Suitable temperatures for practicing the process of this invention are generally within the range of 300° C. to about 900° C., although higher temperatures may be suitable depending upon the polymer to be treated and the desired composition of the final pyrolyzed product. At temperatures above about 700° C. the starting polymer degrades extensively with the formation of molecular sieve sized pores in the product, i.e., 4 Å to 6 Å average critical dimension, yielding a preferred class of adsorbents according to this invention. At lower temperatures, the thermally-formed pores usually range from about 6 Å to as high as 50 Å in average critical size. A preferred range of pyrolysis temperatures is between about 400° C. and 800° C. As will be explained more fully hereinafter, temperature control is essential to yield a partially pyrolyzed material having the composition, surface area, pore structures and other physical characteristics of the desired product. The duration of thermal treatment is relatively unimportant, providing a minimum exposure time to the elevated temperature is allowed.

A wide range of pyrolyzed resins may be produced by varying the porosity and/or chemical composition of the starting polymer and also by varying the conditions of thermal decomposition. In general, the pyrolyzed resins of the invention have a carbon to hydrogen ratio of 1.5:1 to 20:1, preferably 2.0:1 to 10:1, whereas activated carbon normally has a C/H ratio much higher, at least greater than 30:1 (Carbon and Graphite Handbook, Charles L. Mantell, Interscience Publishers, N.Y. 1968, p. 198). The product particles contain at least 85% by weight of carbon with the remainder being principally hydrogen, alkali metals, alkaline earth metals, nitrogen, oxygen, sulfur, chlorine, etc., derived from the polymer or the functional group (carbon-fixing moiety) contained thereon and hydrogen, oxygen, sulfur, nitrogen, alkali metals, transition metals, alkaline earth metals and other elements introduced into the polymer pores as components of a filler (may serve as a catalyst and/or carbon-fixing moiety or have some other functional purpose).

The pore structure of the final product must contain at least two distinct sets of pores of differing average size, i.e., multimodal pore distribution. The larger pores originate from the macroporous resinous starting material which preferably contain macropores ranging from between 50 Å to 100,000 Å in average critical dimension. The smaller pores, as mentioned previously, generally range in size from 4 Å to 50 Å, depending largely upon the maximum temperature during pyrolysis. Such multimodal pore distribution is considered a novel and essential characteristic of the composition of the invention.

The pyrolyzed polymers of the invention have relatively large surface area resulting from the macroporosity of the starting material and the smaller pores developed during pyrolysis. In general the overall surface area as measured by nitrogen adsorption ranges between about 50 and 1500 m$^2$/gram. Of this, the macropores will normally contribute 6 to 700 m$^2$/gram, preferably 6 to 200 m$^2$/g, as calculated by mercury intrusion techniques, with the remainder contributed by the thermal treatment. Pore-free polymers, such as "gel" type resins which have been subjected to thermal treatment in the prior art do not contribute the large pores essential to the adsorbents of the invention nor do they perform with the efficiency of the pyrolyzed polymers described herein.

The duration of pyrolysis depends upon the time needed to remove the volatiles from the particular polymer and the heat transfer characteristics of the method selected. In general, the pyrolysis is very rapid when the heat transfer is rapid, e.g., in an oven where a shallow bed of material is pyrolyzed, or in a fluidized bed. To prevent burning of the pyrolyzed polymer, normally the temperature of the polymer is reduced to not more than 400° C., preferably not more than 300° C., before the pyrolyzed material is exposed to air. The most desirable method of operation involves rapid heating to the maximum temperature, holding the temperature at the maximum for a short period of time (in the order of 0 to 20 minutes) and thereafter quickly reducing the temperature to room temperature before exposing the sample to air. Products according to the invention have been produced by this preferred method by heating to 800° C. and cooling in a period of 20 to 30 minutes. Longer holding periods at the elevated temperatures are also satisfactory, since no additional decomposition appears to occur unless the temperature is increased.

Activating gases such as $CO_2$, $NH_3$, $O_2$, $H_2O$ or combinations thereof in small amounts tend to react with the polymer during pyrolysis and thereby increase the surface area of the final material. Such gases are optional and may be used to obtain special characteristics of the adsorbents.

The starting polymers which may be used to produce the pyrolyzed resins of the invention include macroreticular homopolymers or copolymers of one or more monoethylenically or polyethylenically unsaturated monomers or monomers which may be reacted by condensation to yield macroreticular polymers and copolymers. The macroreticular resins used as precursors in the formation of macroreticular heat treated polymers are not claimed as new compositions of matter in themselves. Any of the known materials of this type with an appropriate carbon-fixing moiety is suitable. The preferred monomers are those aliphatic and aromatic materials which are ethylenically unsaturated.

Examples of suitable monoethylenically unsaturated monomers that may be used in making the granular macroreticular resin include: esters of acrylic and methacrylic acid such as methyl, ethyl, 2-chloro ethyl, propyl, isobutyl, isopropyl, butyl, tert-butyl, sec-butyl, ethylhexyl, amyl, hexyl, octyl, decyl, dodecyl, cyclohexyl, isobornyl, benzyl, phenyl, alkylphenyl, ethoxymethyl, ethoxyethyl, ethoxypropyl, propoxymethyl, propoxyethyl, propoxypropyl, ethoxyphenyl, ethoxybenzyl, ethoxycyclohexul, hydroxyethyl, hydroxypropyl, ethylene, propylene, isobutylene, diisobutylene, styrene, ethylvinylbenzene, vinyltoluene, vinylbenzyl-chloride, vinyl chloride, vinyl acetate, vinylidene chloride, dicyclopentadiene, acrylonitrile, methacrylonitrile, acrylamide, methacrylamide, diacetone acrylamide, functional monomers such as vinylbenzene, sulfonic acid, vinyl esters, including vinyl acetate, vinyl propionate, vinyl butyrate, vinyl laurate, vinyl ketones including vinyl methyl ketone, vinyl ethyl ketone, vinyl isopropyl ketone, vinyl n-butyl ketone, vinyl hexyl ketone, vinyl octyl ketone, methyl isopropenyl ketone, vinyl aldehydes including acrolein, methacrolein, crotonaldehyde, vinyl ethers including vinyl methyl ether, vinyl ethyl ether, vinyl propyl ether, vinyl isobutyl ether, vinylidene compounds including vinylidene chloride bromide, or bromochloride, also the corresponding neutral or half-acid half-esters or free diacids of the unsaturated dicarboxylic acids including itaconic, citraconic, aconitic, fumaric, and maleic acids, substituted acrylamides, such as N-monoalkyl, —N,N-dialkyl-, and N-dialkylamino-alkylacrylamides or methacrylamides where the alkyl groups may have from one to eighteen carbon atoms, such as methyl, ethyl, isopropyl, butyl, hexyl, cyclohexyl, octyl, dodecyl, hexadecyl and octadecyl aminoalkyl esters of acrylic or methacrylic acid, such as .beta.-dimethylamino-ethyl, .beta.-diethylaminoethyl or 6-dimethylaminohexyl acrylates and methacrylates, alkylthioethyl methacrylates and acrylates such as ethylthioethyl methacrylate, vinylpyridines, such as 2-vinylpyridine, 4-vinylpyridine, 2-methyl-5-vinylpyridine, and so on.

In the case of copolymers containing ethylthioethyl methacrylate, the products can be oxidized to, if desired, the corresponding sulfoxide or sulfone.

Polyethylenically unsaturated monomers which ordinarily act as though they have only one such unsaturated group, such as isoprene, butadiene, and chloroprene, may be used as part of the monoethylenically unsaturated category.

Examples of polyethylenically unsaturated compounds include: divinylbenzene, divinylpyridine, divinylnaphthalenes, diallyl phthalate, ethylene glycol diacrylate, ethylene glycol dimethacrylate, trimethylolpropanetrimethacrylate, divinylsulfone, polyvinyl or polyallyl ethers of glycol, of glycerol, of pentaerythritol, of diethyleneglycol, of mono-thio or dithio-derivatives of glycols, and of resorcinol, divinylketone, divinylsylfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, trivinylbenzene, trivinylnaphthalenes, and polyvinylanthracenes.

A preferred class of monomers of this type is aromatic ethylenically unsaturated molecules such as styrene, vinyl pyridine, vinyl naphthalene, vinyl toluene, phenyl acrylate, vinyl xylenes, and ethylvinylbenzene.

Examples of preferred polyethylenically unsaturated compounds include divinyl pyridine, divinyl naphthalene, divinylbenzene, trivinylbenzene, alkyldivinylbenzenes having from 1 to 4 alkyl groups of 1 to 2 carbon atoms substituted in the benzene nucleus, and alkyltrivinylbenzenes having 1 to 3 alkyl groups of 1 to 2 carbon atoms substituted in the benzene nucleus. Besides the homopolymers and copolymers of these poly(vinyl) benzene monomers, one or more of them may be copolymerized with up to 98% (by weight of the total monomer mixture) of (1) monoethylenically unsaturated monomers, or (2) polyethylenically unsaturated monomers other than the poly(vinyl) benzenes just defined, or (3) a mixture of (1) and (2). Examples of the alkyl-substituted di- and tri-vinyl-benzenes are the various vinyltoluenes, the divinylethylbenzene, 1,4-divinyl-2,3,5,6-tetramethylbenzene, 1,3,5-trivinyl-2,4,6-trimethylbenzene, 1,4-divinyl, 2,3,6-triethylbenzene, 1,2,4-trivinyl-3,5-diethylbenzene, 1,3,5-trivinyl-2-methylbenzene.

Most preferred are copolymers of styrene, divinylbenzene, and ethylvinylbenzene.

Examples of suitable condensation monomers include: (a) aliphatic dibasic acids such as maleic acid, fumaric acid, itaconic acid, 1,1-cyclobutanedicarboxylic acid, etc.; (b) aliphatic diamines such as piperazine, 2-methylpiperazine, cis, cis-bis (4-aminocyclohexyl) methane, metaxylylenediamine, etc.; (c) glycols such as diethylene glycol, triethylene glycol, 1,2-butanediol, neopentyl glycol etc.; (d) bischloroformates such as cis and trans-1,4-cyclohexyl bischloroformate, 2,2,2,4-tetramethyl-1,3-cyclobutyl bischloroformate and bischloroformates of other glycols mentioned above, etc.; (e) hydroxy acids such as salicylic acid, m- and p-hydroxy-benzoic acid and lactones, derived therefrom such as the propiolactones, valerolactones, caprolactones, etc.; (f) diisocyanates such as cis and trans-cyclopropane-1,2-diisocyanate, cis and trans-cyclobutane-1-2-diisocyanate etc.; (g) aromatic diacids and their derivatives (the esters, anhydrides and acid chlorides) such as phthalic acid, phthalic anhydride, terephthalic acid, isophthalic acid, dimethylphthalate, etc.; (h) aromatic diamines such as benzidine, 4,4'-methylenediamine, bis(4-aminophenyl) ether, etc.; (i) bisphenols such as bisphenol A, bisphenol C, bisphenol F, phenolphthalein, recorcinol, etc.; (j) bisphenol bis(chloroformates) such as bisphenol A bis(chloroformate), 4,4'-dihydroxybenzophenone bis(chloroformate) etc.; (k) carbonyl and thiocarbonyl compounds such as formaldehyde, acetaldehyde, thioacetone acetone, etc.; (1) phenol and derivatives such as phenol, alkylphenols, etc.; (m) polyfunctional cross-linking agents such as tri or poly basic acids such as trimellitic acid, tri or polyols such as glycerol, tri or polyamines such as diethylenetriamine; and other condensation monomers and mixtures of the foregoing.

Ion exchange resins produced from aromatic and/or aliphatic monomers provide a preferred class of starting polymers for production of porous adsorbents. The ion exchange resin may also contain a functional group selected from cation, anion, strong base, weak base, sulfonic acid, carboxylic acid, oxygen containing, halogen and mixtures of the same. Further, such ion exchange resins may optionally contain an oxidizing agent, a reactive substance, sulfuric acid, nitric acid, acrylic acid, or the like at least partially filling the macropores of the polymer before heat treatment.

The synthetic polymer may be impregnated with a filler such as carbon black, charcoal, bonechar, sawdust or other carbonaceous material prior to pyrolysis. Such fillers provide an economical source of carbon which may be added in amounts up to about 90% by weight of the polymer.

The starting polymers, when ion exchange resins, may optionally contain a variety of metals in their atomically dispersed form at the ionic sites. These metals may include iron, copper, silver, nickel, manganese, palladium, cobalt, titanium, zirconium, sodium, potassium, calcium, zinc, cadmium, ruthenium, uranium and rare earths such as lanthanum. By utilizing the ion exchange mechanism it is possible for the skilled technician to control the amount of metal that is to be incorporated as well as the distribution.

Although the incorporation of metals onto the resins is primarily to aid their ability to serve as catalytic agents, useful adsorbents may also contain metal.

Synthetic polymers, ion exchange resins whether in the acid, base or metal salt form are commercially available.

According to the invention there is also provided an adsorption process for separating components from a gaseous or liquid medium which comprises contacting the medium with particles of a pyrolyzed synthetic polymer.

For example it has been discovered that a styrenedivinylbenzene based strongly acidic exchange resin pyrolyzed from any of the forms of Hydrogen, Iron (III), Copper(II), Silver(I) or Calcium(II) can decrease the concentration of vinylchloride in air preferably dry air from initial concentration of 2 ppm to 300,000 ppm to a level of less than 1 ppm at flow rates of 1 bedvolume/hour to 600 bedvolume/min. preferably 10 to 200 bedvolume/minute.

The partially pyrolyzed macroporous polymer adsorbent of the present invention disclosed herein above are able to adsorb greater than 25 $cm^3$ STP of ethane per gram of sorbent at 35° C. and 200 mmHg of ethane and greater than 30 $cm^3$ STP of propane per gram of sorbent at 35° C. and 100 mmHg of propane. Furthermore, these materials are able to be degassed of ethane or propane and then able to readsorb greater than 25 $cm^3$ STP of ethane per gram of sorbent at 35° C. and 200 mmHg of ethane, or readsorb greater than 30 $cm^3$ STP of propane per gram of sorbent at 35° C. and 100 mmHg of propane one or more times.

In one embodiment of the present invention, there may be multiple adsorbent beds and/or the adsorbent bed(s) may be regenerated in-place as exemplified by U.S. Pat. Nos. 3,458,973; 5,840,099; 8,574,348, which are incorporated herein by reference in their entirety.

The adsorption step and/or the regeneration step of the process of the present invention may operate in as a batch process, a semi-continuous process, a continuous process, or combination thereof. For instance in one embodiment of the present invention, both the adsorption step and the regeneration step may operate in the batch mode. In another embodiment of the present invention both the adsorption step and the regeneration step may operate in the semi-continuous mode. In yet another embodiment of the present invention both the adsorption step and the regeneration step may operate in the continuous mode.

Alternatively, in one embodiment of the present invention the adsorption step may operate in a batch, semi-continuous, or continuous mode while the regeneration step operates in a different mode than that of the adsorption step. For example, in one embodiment of the present invention the adsorption step may operate in a batch mode while the regeneration step operates in a continuous mode. In another embodiment of the present invention the adsorption step may operate in a continuous mode while the regeneration step operates in a continuous mode. All possible combinations of batch, semi-continuous, and continuous modes for the adsorbent step and regeneration step are considered within the scope of the present invention.

Adsorption is in many situations a reversible process. The practice of removing volatiles from an adsorption media can be accomplished by reducing the pressure over the media, heating, or the combination of reduced pressure and heating. In either case the desired outcome is to re-volatilize the trapped vapors, and subsequently remove them from the adsorbent so that it can be reused to capture additional volatiles. Preferably, the adsorption media of the present invention when regenerated, desorbs adsorbed gases in an amount equal to or greater than 75 percent of the amount adsorbed, more preferably equal to or greater than 85 percent, more preferably equal to or greater than 90 percent, more preferably equal to or greater than 95 percent, more preferably equal to or greater than 99 percent and most preferably virtually all the NGLs adsorbed.

Traditional means of heating adsorbent media for the purpose of removing adsorbed volatiles that utilize conventional heating systems such as heated gas (air or inert gas), or radiant heat contact exchangers are suitable for use in the present NGL separation process as part of the adsorbent media regeneration step.

The separation process comprises passing a natural gas stream through an adsorber bed charged with the adsorbent (s) of the invention. Preferably, the ethane and/or propane and/or butane and/or pentane and/or heavier hydrocarbons, which are selectively adsorbed, can be readily desorbed either by lowering the pressure or by increasing the temperature of the adsorber bed resulting in a regenerated adsorbent. The adsorbent so regenerated can be reused as an adsorbent for the separation of ethane and/or propane and/or butane and/or pentane and/or heavier hydrocarbons from the natural gas stream.

In one embodiment of the process of the present invention, the NGL separation process employs a microwave heating system as part of the adsorbent media regeneration step. Such a microwave heating system provides a heating system and method for removing volatiles from adsorbent media with higher thermal efficiency at a reduced cost. Preferably, the microwave regeneration system is able to operate in a batch, semi-continuous, or continuous process. One advantage of using a microwave system in conjunction with adsorbents of the present invention is that it allows the microwaves to minimize the heating of the media, but maximize heating of the NGLs to encourage desorption. As such it has the benefits of being operationally simpler than traditional regeneration systems, and reduces the heat effects on the adsorbent material itself. Furthermore, when this desorption process is used in conjunction with a continuous adsorption process such as a moving packed bed or similar device, the hydrocarbon removal can be closely tailored to the composition of the feed gas such that the recovered gas can have improved purity and, when present, reduced load on the subsequent chiller apparatus which allows for recovery and later transport as a liquid.

In one embodiment, the NGL adsorption/desorption separation process of the present invention is performed within a pressure swing adsorption (PSA) vessel containing an adsorbent material comprising one or more porous cross-linked polymeric adsorbents, one or more pyrolized macroporous polymers, or mixtures thereof and is followed by an adsorbent regeneration sequence comprising the steps of depressurizing/venting the adsorption vessel down to low pressure followed by repressurizing the adsorbent-containing vessel with a portion of the purified gas stream back to the pressure level at which the gas stream was initially contacted with the adsorbent.

Also preferably, the depressurization is partly performed via one or more pressure equalization steps with other PSA vessels undergoing said repressurizing. The skilled practitioner will appreciate that this will recover some of the void methane and thus improve the recovery of the methane, albeit at the expense of additional PSA vessels operating sequentially in parallel with one another.

Also preferably, the depressurizing is performed down to vacuum pressure levels by connecting the adsorption vessel to a vacuum pump (i.e. vacuum swing adsorption or VSA). The skilled practitioner will appreciate that this will improve the adsorbent's rejection of the adsorbed impurities during the depressurization step, albeit at the expense of power.

Also preferably, the adsorbent is purged or rinsed with a portion of the purified gas stream subsequent to said depressurization step and prior to said repressurization step. The skilled practitioner will appreciate that this will further improve the adsorbent's rejection of the adsorbed impurities, albeit at the expense of methane recovery. Note however that in a typical PSA process, the purge step is performed at 1 atm pressure. By lowering the purge pressure to 0.1 atm, one can obtain the same degree of purging with about 10% of the gas required at 1 atm Thus the methane recovery penalty associated with purging is much less severe in a VSA process as opposed to a PSA process.

Also preferably, the steps of the process are performed as a continually repeating cycle of steps in a system comprising a plurality of adsorption vessels which each undergo their respective cycle of steps while collectively operated sequentially in parallel with one another. The cycle time depends on the specific design but typically might be one minute per step.

In one embodiment of the present invention, the NGL adsorption/desorption separation process of the present invention is performed within a temperature swing adsorption (TSA) vessel containing an adsorbent material comprising one or more porous cross-linked polymeric adsorbents, one or more pyrolized macroporous polymers, or mixtures thereof. This is a batch-wise process consisting of two basic steps which are adsorption and regeneration. In the adsorption step, NGLs are removed by being adsorbed on the adsorbent material forming a methane-rich stream. In the regeneration step, NGLs are desorbed from the adsorbent material by means of a regeneration gas.

Any inert or easily separated gas can be used as a regeneration gas. However, using the heated product gas can improve regeneration, for example if desorbing propane, heating propane gas to 150° C. and then flowing it through the desorption chamber will heat the adsorbent media, which will cause much of the adsorbed gases to evaporate. Keeping the desorbed gas purity high can dictate the choice of the regeneration gas. In one embodiment, the regeneration gas is a heated split stream from the desorbed gas, such that the gas mixture composition is close to the composition of the adsorbed gas, with the only change being the temperature of the regeneration gas.

The regeneration step consists of two major parts: heating and cooling. In the heating part of the process, the regeneration stream is heated to an elevated temperature (preferably between 70° C. to 150° C.) in one embodiment of the invention) and flows over the adsorbent material. Due to the heat of the gas, mainly used as heat of desorption, and the difference in partial pressure of the contaminants on the adsorbent material and in the regeneration gas stream, the NGLs desorb from the adsorbent material and leave the unit with the regeneration gas. A cooling step is then necessary. As a result of the heating step the adsorbent material heats up. To prepare the adsorbent material again for the next adsorption step and since adsorption is favored at lower temperatures than desorption, the adsorbent material is cooled by means of a stream typically flowing over the adsorbent material at a temperature very close to the feed stream temperature.

Hence, the most basic form of a temperature swing adsorbent process unit consists of two vessels with one vessel in adsorption mode and the other vessel in regeneration mode. However, dependant on the amount of the natural gas feed stream to be treated as well the amount of NGLs to be removed from the natural gas feed stream, several vessels, which operate in a parallel mode, can be used. In a more complicated form of operation, the regeneration step can also be split over two vessels in a series-heat-and-cool cycle, where one of the vessels would be in the heating step and another would be in the cooling step.

Apart from the basic adsorption and regeneration steps described above, additional steps may need to be included dependent on the pressure levels of the natural gas feed stream versus the regenerant stream. For instance, if adsorption is carried out at a higher pressure than regeneration (note that a lower pressure will favor desorption of contaminants from the adsorbent material), at a minimum, two additional steps are required: a depressurization step where the pressure is reduced from adsorption pressure to the regeneration pressure; and a repressurization where the pressure is increased from the regeneration pressure to adsorption pressure. Note that sometimes the opposite is true, with regeneration carried out at a higher pressure than adsorption, but in this case again a depressurization and repressurization step need to be included. If depressurization and repressurization steps are present they are typically part of the regeneration cycle.

In one embodiment the present invention is a process for separating natural gas liquids from a natural gas feedstream comprising methane and one or more of ethane, propane, butane, pentane, or heavier hydrocarbons, comprising the steps of: (a) providing an adsorbent bed comprising an adsorbent media comprising a porous cross-linked polymeric adsorbent, a pyrolized macroporous polymer, or mixtures thereof, wherein said adsorbent media adsorbs ethane, propane, butane, pentane, heavier hydrocarbons, and/or mixtures thereof; (b) passing the natural gas feedstream through the adsorbent bed to provide a methane rich natural gas stream and a loaded adsorbent media; (c) recovering, transporting, liquefying, or flaring the methane rich natural gas stream, (d) regenerating the loaded adsorbent media to release the adsorbed ethane, propane, butane, pentane, heavier hydrocarbons, and/or mixtures thereof, (e) recovering, transporting, liquefying, re-injecting, excluding, by-passing, or flaring the ethane, propane, butane, heavier hydrocarbons, and/or pentane individually and/or as mixtures; and (f) reusing the regenerated adsorbent media, wherein the said passing of the natural gas stream through the adsorbent bed is performed in a pressure swing adsorption (PSA) vessel containing said adsorbent media, a temperature swing adsorption (TSA) vessel containing said adsorbent media, or a PSA vessel in combination with a TSA vessel.

In a preferred embodiment of the present invention, the steps of the process described herein above are performed as a continually repeating cycle of steps in a system comprising a plurality of adsorption vessels which each undergo their respective cycle of steps while collectively operated sequentially in parallel with one another. In such a continuous process, the adsorbent media can be stationary within the adsorption/desorption system and/or the adsorbent media can be continuously moved between chambers.

In yet another embodiment of the present invention where the adsorption/desorption process is continuous, the process further comprises a step in which feedback is provided such that the adsorption time can be quickly and easily adjusted, either manually or automatically, to control the contact time of the natural gas stream with the adsorbent media. The contact time may be varied by changing the flow rate of the natural gas stream and/or the rate of the adsorbent (e.g., the speed of a moving bed). Such a feedback mechanism is applicable to any suitable adsorption/desorption process, preferably to a microwave regeneration system, PSA process, or TSA process.

The feedback mechanism comprises a means for measuring (for example gas chromatography and/or mass spectrometry analysis weight change in the loaded adsorbent media (as measured by weigh cells), temperature probes in the adsorbent bed that can measure the position of the adsorbent loading front (due to released heat of adsorption) or any other analytical tool that is able to determine the composition of a gas stream regarding the inlet composition of a feed stream for target gases (such as C1, C2 or C3). The data regarding the inlet feed composition is fed to a computer that estimates the optimal process conditions in terms of inlet feed gas flow rate and adsorbent media bed flow rate for a target application. For example, the system can be operated such that the output of one of the methane rich gas streams maintains a target range of BTU value that is appropriate for engine operation. A second example is maintaining a target purity for the desorbed higher hydrocarbons that could be used as liquid fuels or for downstream chemistries. Such a feedback system is required due to the inherent variability of composition and flow rates of natural gas streams, both from the wellhead and from the natural gas pipeline system.

Controlling the contact time via the feedback mechanism allows for selective removal of one or more specific NGL in a consistent and predictable manner. Further, the adsorbent media may be readily and efficiently regenerated in a short period of time so that the inventory of media can be minimized and cost of the system can be minimized.

EXAMPLES

A description of the raw materials used in the Examples is as follows.

Example 1 is a porous cross-linked polymeric adsorbent having a high surface area equal to or greater than 1,000 m$^2$/g made from a macroporous copolymer of a monovinyl aromatic monomer and a crosslinking monomer, where the macroporous copolymer has been post-crosslinked in the swollen state in the presence of a Friedel-Crafts catalyst;

Example 2 is a porous cross-linked polymeric adsorbent having a surface area equal to or greater than 1,000 m$^2$/g made from a macroporous copolymer of a monovinyl aromatic monomer and a crosslinking monomer, where the macroporous copolymer has been post-crosslinked in the swollen state in the presence of a Friedel-Crafts catalyst with post capping of residual chloromethyl groups with hydrophobic aromatic compounds resulting in a media that has increased hydrophobicity; and Example 3 is a partially pyrolized macroporous polymer of a monovinyl aromatic monomer and a crosslinking monomer that has been sulfonated.

Adsorption capacity and breakthrough properties are determined for Example 1 and Example 2 as followed:

Adsorption Capacity

Methane, Ethane, Propane and Butane:

A Micromeritics ASAP 2020 Surface Area and Porosity Analyzer is used to analyze methane (Sigma-Aldrich, 99.0%), ethane (Sigma-Aldrich, 99.99), propane (Sigma-Aldrich, 99.97%), and butane (Matheson Tri-Gas, 99.9%) adsorption at 308 K. Prior to analysis, the macroporous polymeric adsorbent being tested (0.3 to 0.5 grams) is degassed in a quartz U-tube at 423 K under vacuum to a pressure below 5 μmHg for 12 hours. Pressure points are taken between 5 to 600 mmHg with a 45 seconds equilibration interval. The samples are then evacuated under vacuum for 1 hour before repeating the pressure points.

Pentane:

A Micromeritics ASAP 2020 Surface Area and Porosity Analyzer equipped with vapor introduction option with dual-zone temperature control is used to analyze static pentane adsorption at 273 K. An ethylene glycol/water mixture contained within a chiller dewer is used as temperature control for the sample. Pentane (Sigma-Aldrich, anhydrous, ≥99%) is placed in a quartz vessel located in the temperature-regulated vapor furnace which is controlled to 308K. Prior to pentane analysis, the macroporous polymeric adsorbent being tested is degassed in a quartz tube at 373 K under vacuum to a pressure below 5 μmHg for at least 12 hours. Relative pressure points are taken between 0.005<P/P$_0$<0.50. The saturation pressure, P$_0$, was calculated to be 183.526 mmHg based on pentane adsorptive properties and the analysis bath temperature.

Figure 1:
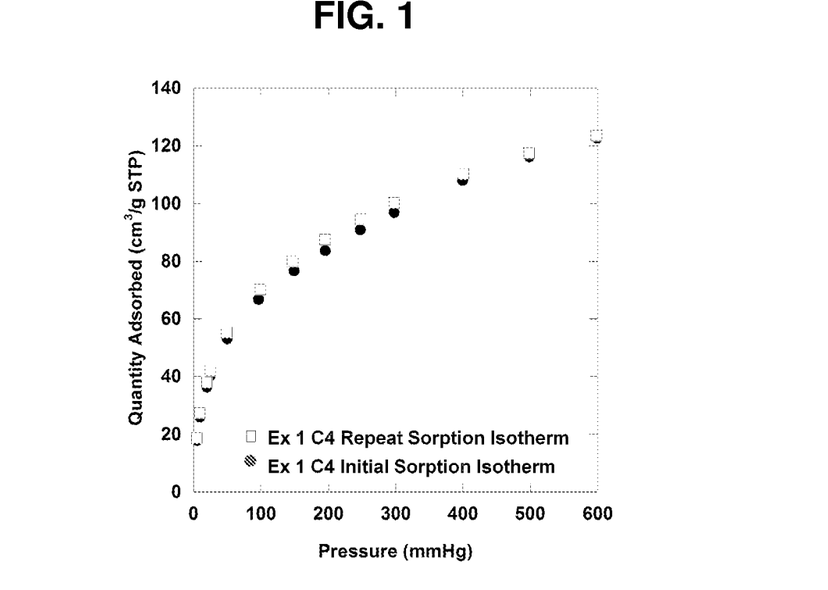
FIG. 1 shows the initial and repeat sorption isotherms for butane for Example 1 an example of the present invention.
Figure 2:
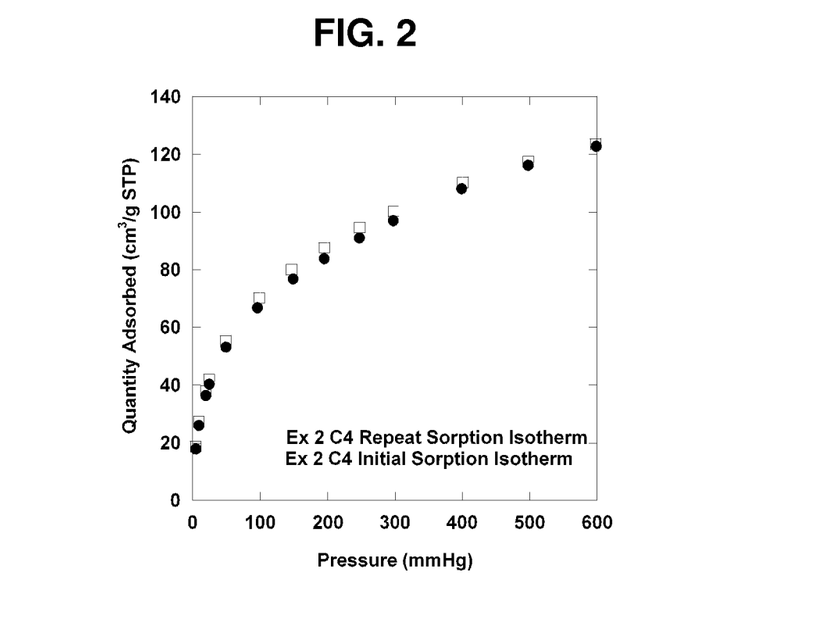
FIG. 2 shows the initial and repeat sorption isotherms for butane for Example 2 an example of the present invention.

FIGS. 1 and 2 show the initial and repeat adsorption isotherms for butane for Example 1 and Example 2, respectively.

Figure 3:
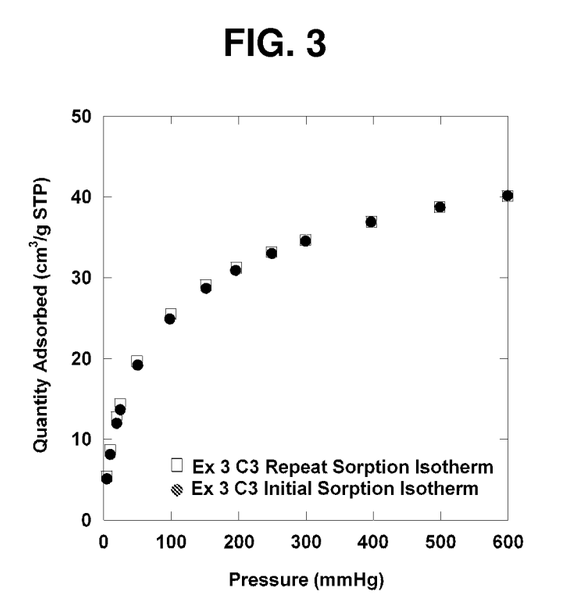
FIG. 3 shows the initial and repeat sorption isotherms for propane for Example 3 an example of the present invention.

FIG. 3 shows the initial and repeat adsorption isotherms for propane for Example 3.

Figure 4:
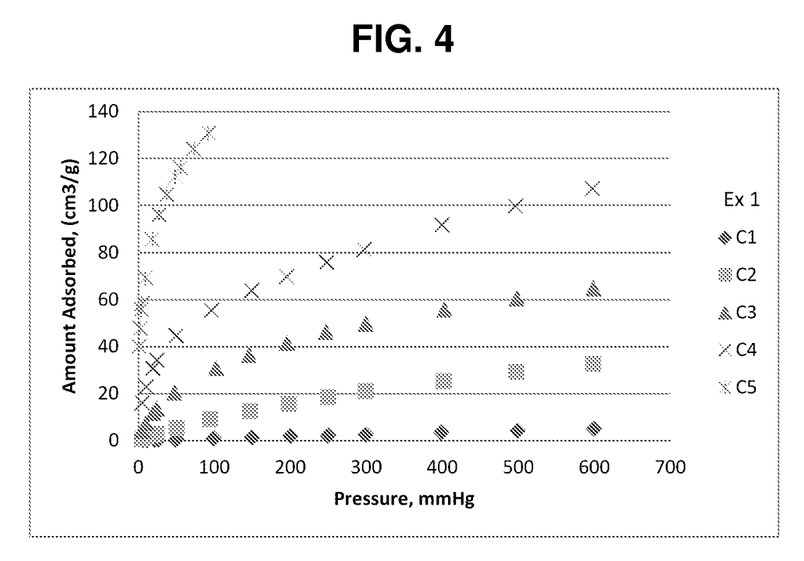
FIG. 4 shows the sorption isotherms for methane, ethane, propane, butane, and pentane for Example 1 an example of the present invention.
Figure 5:
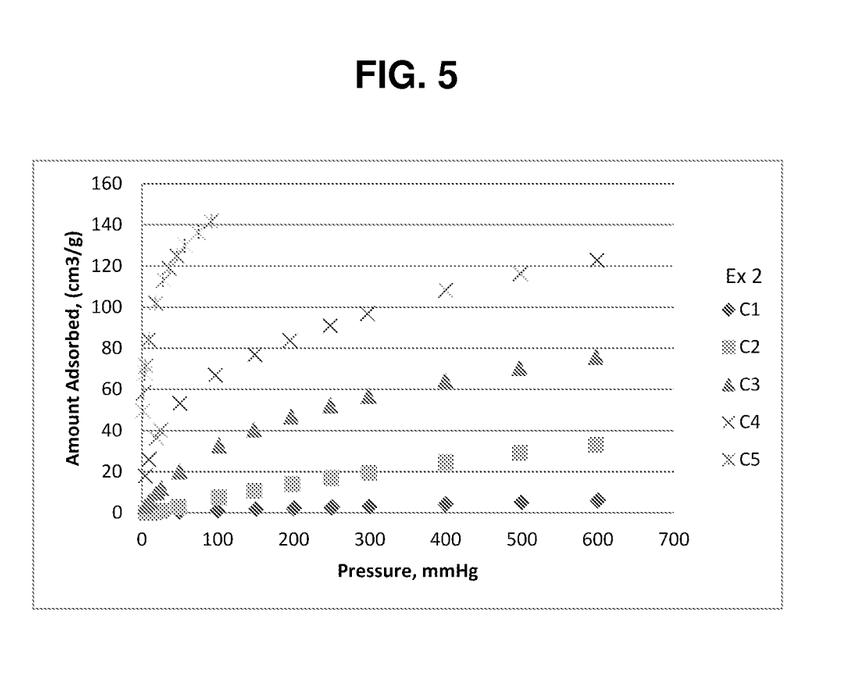
FIG. 5 shows the sorption isotherms for methane, ethane, propane, butane, and pentane for Example 2 an example of the present invention.
Figure 6:
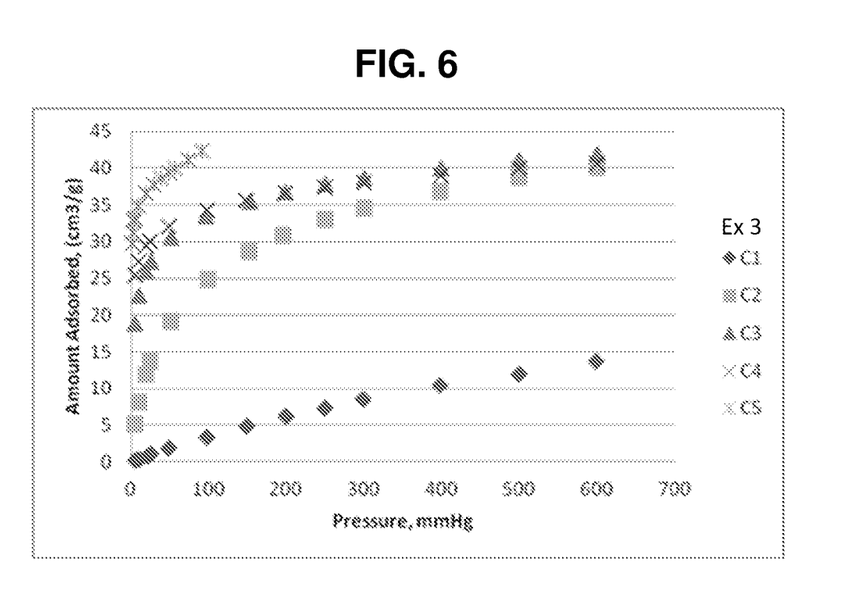
FIG. 6 shows the sorption isotherms for methane, ethane, propane, butane, and pentane for Example 3 an example of the present invention.

FIGS. 4, 5, and 6 show the adsorption isotherms for methane (C1), ethane (C2), propane (C3), butane (C4), and pentane (C5) for Examples 1, 2, and 3, respectively.

Adsorption Breakthrough

Breakthrough curve data for the macroporous polymeric adsorbent is determined using a GC/mass spectrometer (mass spec). The GC/mass spec is calibrated then a 40 g sample is loaded into the sample column. A mixed gas comprising a ratio of CH$_4$/C$_2$H$_6$/C$_3$H$_8$/C4H$_{10}$ at 40/40/40/40 standard cubic centimeters per minute (SCCM) is analyzed. Gas flow is initiated. This flow by-passes the packed bed (i.e., column). The system is allowed to equilibrate for 2 hours. The gas from the by-pass is then analyzed by the mass spec. Following a two minute delay, the three-way valve is opened to allow the mixed gas to enter the packed bed column. The data for the mass spec analysis of the mixed gas leaving the packed bed column is recorded.

The system is allowed to run until all four gases have been analyzed in the mass spec and recorded. Table 1 lists the breakthrough times for each gas.

TABLE 1

| Polymeric Sorbent Media | Example 1 | Example 2 | Example 3 |
|---|---|---|---|
| Weight, g | 40 | 40 | 40 |
| Volume, cc | 109 | 130 | 71 |
| Bulk Density, g/cc | 0.37 | 0.31 | 0.56 |
| Methane breakthrough, min | 5.2 | 6 | 6.3 |
| Ethane breakthrough, min | 13.2 | 16.5 | 11.1 |
| Propane Breakthrough, min | 27.3 | 33.2 | 16.4 |
| Butane breakthrough, min | 64 | 81.4 | 31.9 |

What is claimed is:

1. A process for separating natural gas liquids from a natural gas feedstream comprising methane and one or more of ethane, propane, butane, pentane, or heavier hydrocarbons, comprising the steps of:
   (a) providing an adsorbent bed comprising an adsorbent media comprising a porous cross-linked polymeric adsorbent which is a polymer of a monovinyl aromatic monomer crosslinked with a polyvinylidene aromatic compound, wherein said adsorbent media adsorbs ethane, propane, butane, pentane, heavier hydrocarbons, and/or mixtures thereof,
   (b) passing the natural gas feedstream through the adsorbent bed to provide a methane rich natural gas stream and a loaded adsorbent media, (c) recovering, transporting, liquefying, or flaring the methane rich natural gas stream, (d) regenerating the loaded adsorbent media to release the adsorbed ethane, propane, butane, pentane, heavier hydrocarbons, and/or mixtures thereof, (e) recovering, transporting, liquefying, re-injecting, excluding, by-passing, or flaring the ethane, propane, butane, heavier hydrocarbons, and/or pentane individually and/or as mixtures, and (f) reusing the regenerated adsorbent media in step (b), wherein said passing of the natural gas stream through the adsorbent bed is performed in a pressure swing adsorption (PSA) vessel containing said adsorbent media, a temperature swing adsorption (TSA) vessel containing said adsorbent media, or a PSA vessel in combination with a TSA vessel.

2. The process of claim 1 wherein the steps of the process are performed as a continually repeating cycle of steps in a system comprising a plurality of adsorption vessels which each undergo their respective cycle of steps while collectively operated sequentially in parallel with one another.

3. The process of claim 1 wherein the monovinyl aromatic monomer comprises from 92% to 99.25% by weight of said polymer, and said polyvinylidene aromatic compound comprises from 0.75% to 8% by weight of said polymer.

4. The process of claim 1 wherein the cross-linked macroporous polymeric adsorbent is a polymer of a member selected from the group consisting of styrene, vinylbenzene, vinyltoluene, ethylstyrene, and t-butylstyrene; and is cross-linked with a member selected from the group consisting of divinylbenzene, trivinylbenzene, and ethylene glycol dimethacrylate.

5. The process of claim 4 wherein the cross-linked macroporous polymeric adsorbent has a total porosity of from 0.5 to 1.5 cc/g, a surface area of from 150 to 2100 $m^2/g$ as measured by nitrogen adsorption, and an average pore diameter of from 10 Angstroms to 100 Angstroms.

* * * * *